Nov. 12, 1935. H. JUNGHANS Re. 19,755

FUSE FOR AEROPLANE DEFENSE PROJECTILES

Original Filed July 30, 1931 3 Sheets-Sheet 1

Inventor:
Helmut Junghans
By Emil Bönnelycke
Attorney

Nov. 12, 1935. H. JUNGHANS Re. 19,755

FUSE FOR AEROPLANE DEFENSE PROJECTILES

Original Filed July 30, 1931 3 Sheets-Sheet 2

Inventor:
Helmut Junghans
By Emil Bönnelycke
Attorney

Nov. 12, 1935. H. JUNGHANS Re. 19,755

FUSE FOR AEROPLANE DEFENSE PROJECTILES

Original Filed July 30, 1931 3 Sheets-Sheet 3

Inventor:
Helmut Junghans
By Emil Bönnelycke
Attorney

Reissued Nov. 12, 1935

Re. 19,755

UNITED STATES PATENT OFFICE 19,755

FUSE FOR AEROPLANE DEFENSE PROJECTILES

Helmut Junghans, Schramberg, Germany, assignor to Società Anonima Arturo Junghans Fabrica D'Orologeria, Venice, Italy Original No. 1,969,222, dated August 7, 1934, Serial No. 554,103, July 30, 1931. Application for reissue July 25, 1935, Serial No. 33,179. In Germany March 7, 1931

7 Claims. (Cl. 102—37)

My invention relates to an improved compound fuse for use in connection with projectiles to be fired from guns in defense against aeroplanes.

Projectiles of this kind are usually provided with percussion-fuses. As in general, however, the chance of hitting the aim, that is the hostile aeroplane, is but slight, the firing of shots always entails the danger of the missing projectile returning to the ground so as to explode and do damage to the own ranks of the defenders.

The chief object of the present invention is to obviate this defect, and with this object in view I provide means which will cause the projectile to explode in the air even in case of missing the aim, preferably upon attaining the culminating point of its trajectory. To this end I combine the said percussion fuse with a mechanical time-fuse adapted and set to detonate and ignite the charge of the projectiles after said culmination has been reached, that is after the expiration of a period of five to six seconds, immediately upon the firing of the shot. A centrifugal member connected with an escapement mechanism, and serving as a means for driving and releasing the clockwork of the time-fuse, is adapted to unlock, at the end of its movement, the time-fuse pin so that the latter will be free to cause ignition. The said pin normally abuts immediately against the centrifugal member.

An arrangement of the described kind will act for the purpose in view with a sufficient degree of accuracy. In order to increase the retarding action, however, the friction imparted to the anchor forming, in connection with a clockwork driven by the centrifugal member, the said escapement mechanism, may be increased by mounting the anchor about a bushing of a comparatively great diameter, the said bushing forming a part of the passageway of the pin of the percussion fuse. A weight interchangeably or adjustably attached to the said anchor may be used, if required or desired, for controlling the friction produced by centrifugal action.

As in clockwork fuses of this type high transmission from the power shaft having a short way only available, to the escapement wheel which ought to revolve at a highest possible speed is indispensible, but little room only is available for the accommodation of the transmission gears, another essential feature of the present invention resides in the arrangement of two transmission gears on a single arbor or shaft.

A further feature of the present invention resides in the particular configuration of the percussion pin. Pins arranged to not aline with the rotation axis are liable to excessive friction on their bearing surfaces due to the prevailing centrifugal action, it being not advisable to increase the power of the spring acting to force the pin downwards, for the purpose of overcoming or decreasing such friction, because the radial load on the pin and consequently the frictional contact thereof with the bearing surfaces will increase in accordane with the increase of the pressure of the spring. According to the present invention the means employed for remedying the defect consists in tapering the percussion pin, at its bearing points, towards the top of the fuse, so as to be of conical shape at said points. The effect attained thereby even may be further increased by similarly shaping the opposite guiding or counterfaces to form conical bearings.

With the above recited objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the accompanying drawings forming a part of this specification and showing for purposes of exemplification a preferred form and manner in which the invention may be embodied and practiced, but without limiting the claimed invention to such illustrative instances:

Figure 1:
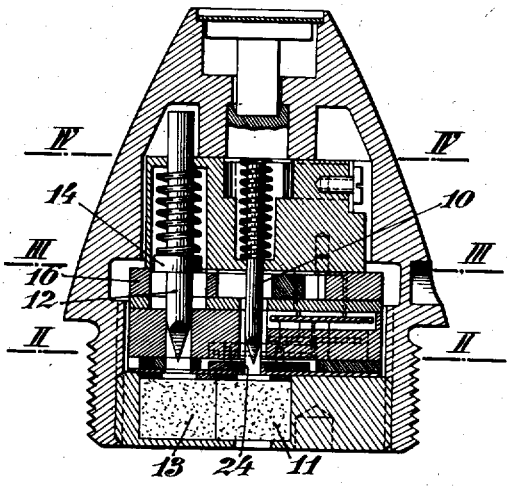
Figure 1 is a view in longitudinal section of the fuse constructed in accordance with the present invention.
Figure 2:
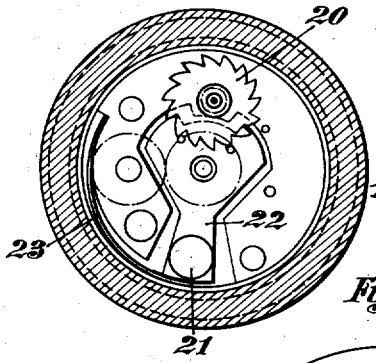
Figs. 2, 3 and 4 are cross-sections taken on the lines II—II, III—III and IV—IV, respectively, of Figure 1.
Figure 3:
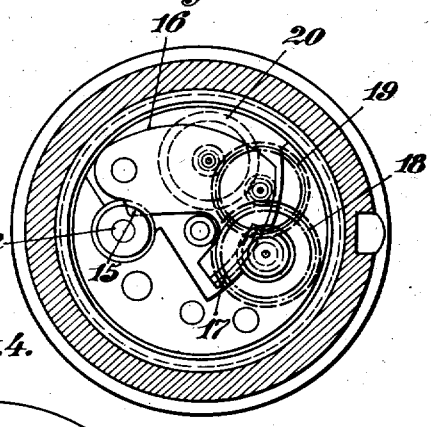
Figure 4:
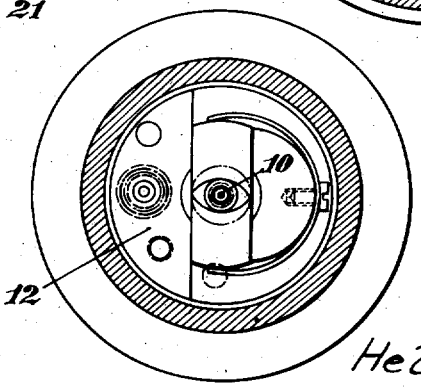

Referring to Figs. 1 to 4, a time fuse mechanism including a percussion or ignition pin 12 and a detonating primer 13, is provided in the fuse casing adjacent to but spaced apart from the percussion fuse mechanism including an impact pin 10 and a detonating primer 11 located in the axial line of the said casing. The pin 12 is shaped to form a collar 14 adapted to abut a part 15 of a centrifugal member 16 normally, that is during storage or transportation, so as to be locked. The centrifugal member 16 is positively connected with an escapement wheel 20 by means of its toothed segment 17 and an intermediate gearing or clockwork comprising two spur wheels 18 and 19, the said wheel 20 acting to operate an anchor or armature 22 which, if required or preferred, may be loaded with an adjustable weight 21.

Normally, that is during storage or transportation, the anchor 22 is retained in locked position by means of a centrifugal spring 23 which is known in itself and, therefore, deserves no detailed description. In order to ensure a highest possible retarding effect, or, in other words, a highest possible frictional contact between the anchor or armature and the bearing surfaces supporting the same, the anchor is mounted about a bushing 24 forming a part of the passageway provided for the impact pin 10. By selectively increasing or decreasing the loading capacity of the interchangeable or adjustable weight 21, the frictional effect between the supporting bushing 24 and the anchor or armature can be changed and consequently the running period of the time mechanism of the fuse be controlled conformingly.

The operation of the fuse is as follows:—

Normally during storage and transportation the nose 15 of the centrifugal member 16 acts to lock the percussion pin 12 of the time fuse mechanism. Upon firing, the centrifugal member 16 of the fuse attached to the flying projectile causes the clockwork mechanism comprising the train of gears 18, 19 and 20, to start. If the projectile misses its aim and the impact pin 10 (or percussion fuse mechanism), therefore, does not bring about explosion of the shell, the time pin 12 (or time fuse mechanism) will be unlocked by the centrifugal member after the expiration of the period of time for which the same has been set and which normally amounts to at least 5 to 6 seconds, so that the shell will explode in the rear of the aim, it being preferable to so set the time fuse mechanism that explosion will take place after the shell has reached a maximum efficient height or a point near the culmination of its flight.

Figure 6:
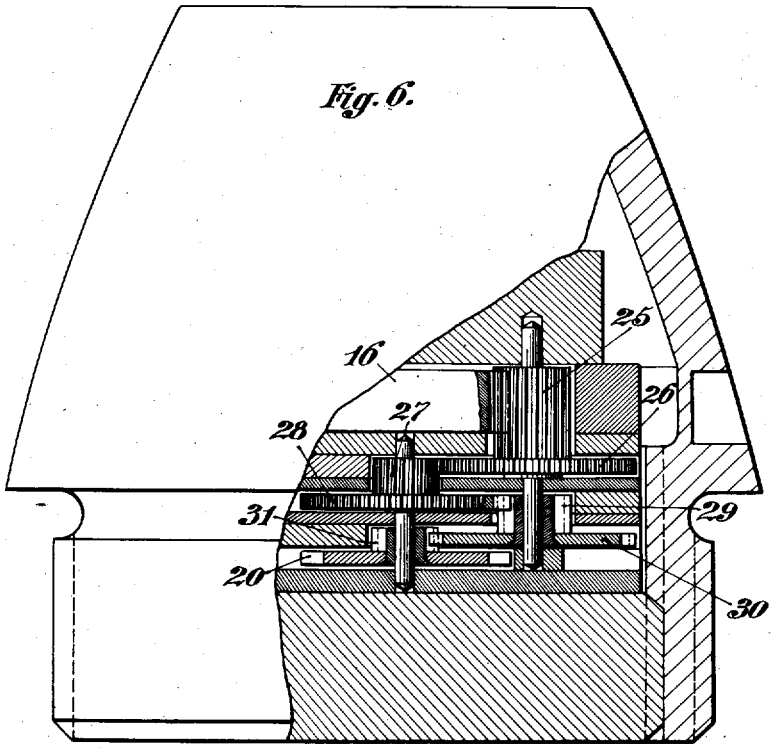
Fig. 6 is a view in elevation, partly in section, taken on the line VI—VI of Fig. 5 and showing a somewhat modified gearing or clockwork on an enlarged scale, for the release of the percussion pin.
Figure 5:
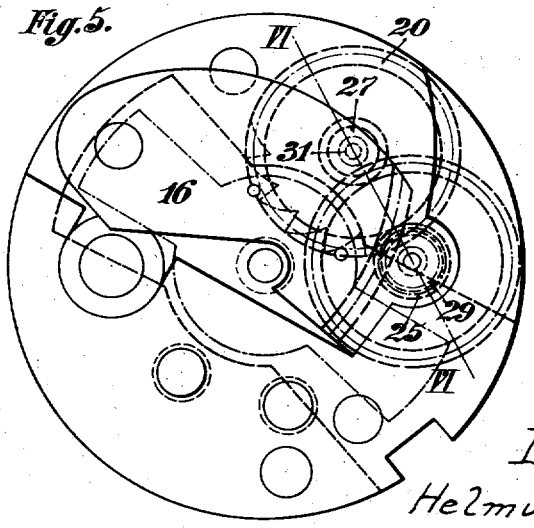
Fig. 5 is a diagrammatic view in top plan of a gearing or clockwork employed in connection with the fuse.

In the modification shown in Figs. 5 and 6 the centrifugal member or toothed segment 16 engages in a pinion 25 integral with a spur wheel 26 meshing with a pinion 27 forming an integral part of a spur wheel 28 adapted to engage in a pinion 29. The latter is integrally formed with a spur wheel 30, which in turn meshes with a pinion 31 firmly connected or integral with the escapement wheel 20, so that the latter will be actuated by the centrifugal member through the agency of the train of wheels described and shown herein. The pinion 29 with its wheel 30 is loosely mounted on the elongated arbor of the wheel 26 and the pinion 31 with the wheel 20 is similarly disposed loosely on the elongated arbor of the wheel 28 as will be readily understood by persons skilled in the art.

Figure 7:
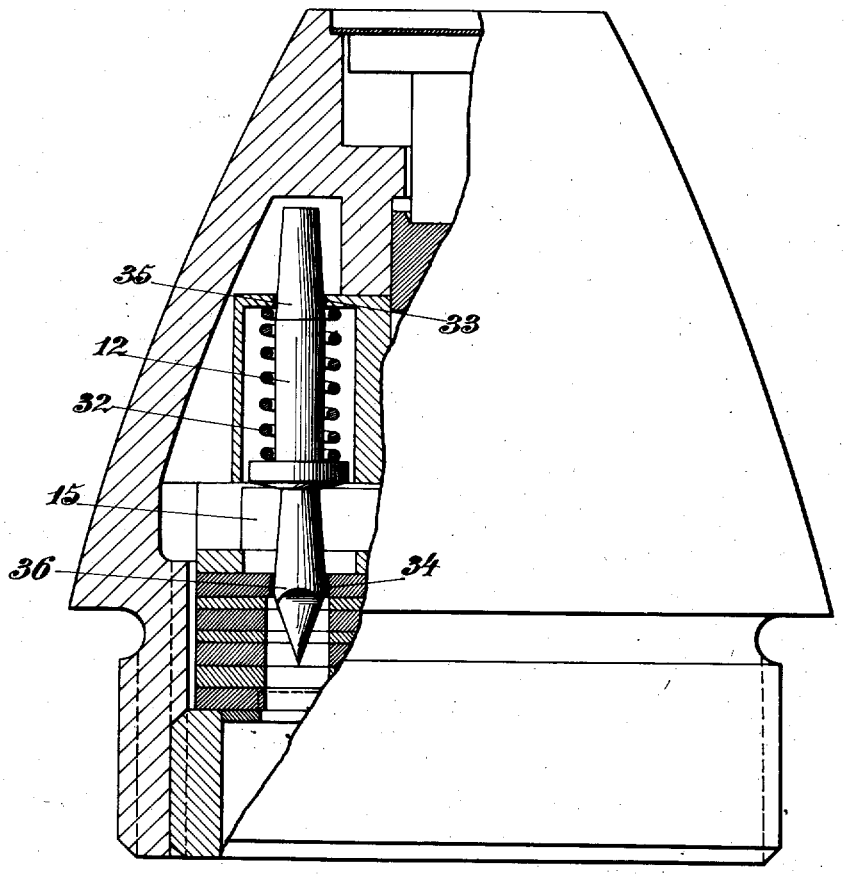
Fig. 7 is a view partly in elevation, partly in section, showing a further modification of the invention.

In the modification illustrated in Fig. 7 the percussion pin 12 is shown to be supported or locked by the nose 15 hereinbefore referred to. Upon release the pin 12 will be pushed downwards by the stressed spring 32 in order to hit and strike upon the primer.

It will be seen that both the top and the bottom end of the pin 12 are tapered or shaped to form conical surfaces 35 and 36, respectively, to conform to the conical contacting surfaces 33 and 34, respectively, of the guiding members.

It is obvious that this particular construction will enable the pin when actuated by the spring 32, to readily slide in the guiding members with a minimum of friction only.

I have not attempted to explain all of the minute details of the construction of the fuse because they will be self-suggesting to the men of the art and experts in fuses will be able to supply all such details in their correct design, proper in their size and relationship.

I claim as my invention:—

1. A compound fuse for projectiles particularly for use against aircraft, comprising a mechanical time fuse; and a percussion fuse adapted to explode the projectile by impact and arranged adjacent the time fuse, said percussion fuse having a firing pin in the axis of the fuse, a clockwork including a wheel train, a centrifugal member for driving the same, and an armature forming an escapement member, said armature member being journalled around the passageway of the firing pin to increase its friction, whereby the clockwork will operate to release the firing pin to explode the projectile when the percussion fuse fails to operate when the projectile attains its highest point in its trajectory.

2. A compound fuse according to claim 1 in which the firing pin of the time fuse immediately abuts the centrifugal member driving the fuse mechanism.

3. A compound fuse according to claim 1 in which the time fuse has an anchor and an interchangeable loading weight for the anchor.

4. A compound fuse according to claim 1 in which the firing pin of the time fuse immediately abuts the centrifugal member driving the fuse mechanism, and the clockwork for the time fuse has two sets of wheels and pinions and common arbors and shafts on which said sets are arranged whereby one set is integral with the arbors and the other set is loosely mounted thereon.

5. A compound fuse according to claim 1 in which the percussion fuse is provided with conically shaped guiding surfaces and in which a percussion pin is also provided having corresponding conical surfaces.

6. A compound fuse according to claim 1 in which the time fuse has an anchor and an adjustable loading weight for the anchor.

7. A compound fuse according to claim 1 in which the time fuse has an anchor, and in which a bushing is provided on which the escapement mechanism is mounted, and an impact pin for the percussion fuse, said bushing forming a part of a passageway for the impact pin and being of large diameter to increase the friction.

HELMUT JUNGHANS.